(No Model.) 3 Sheets—Sheet 1.

J. M. POLLARD.
COTTON SEED DELINTER.

No. 565,793. Patented Aug. 11, 1896.

Witnesses
J. M. Stewart
F. A. Albright

Inventor
J M Pollard (No Model.)  
J. M. POLLARD.  
COTTON SEED DELINTER.

No. 565,793.  
Patented Aug. 11, 1896.

3 Sheets—Sheet 2.

Witnesses  
J. M. Stewart  
F. A. Albright

Inventor  
J. M. Pollard (No Model.) 3 Sheets—Sheet 3.
J. M. POLLARD.
COTTON SEED DELINTER.
No. 565,793. Patented Aug. 11, 1896.
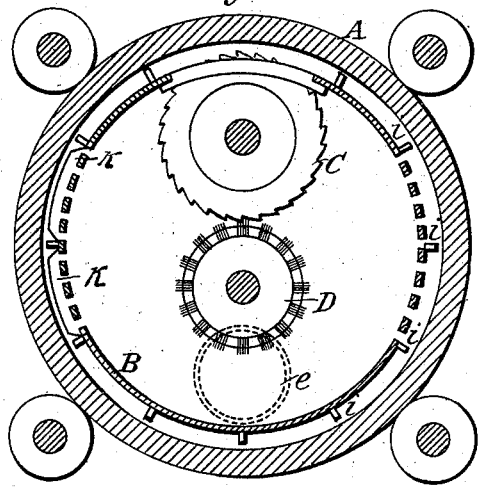
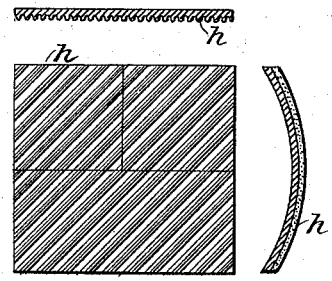
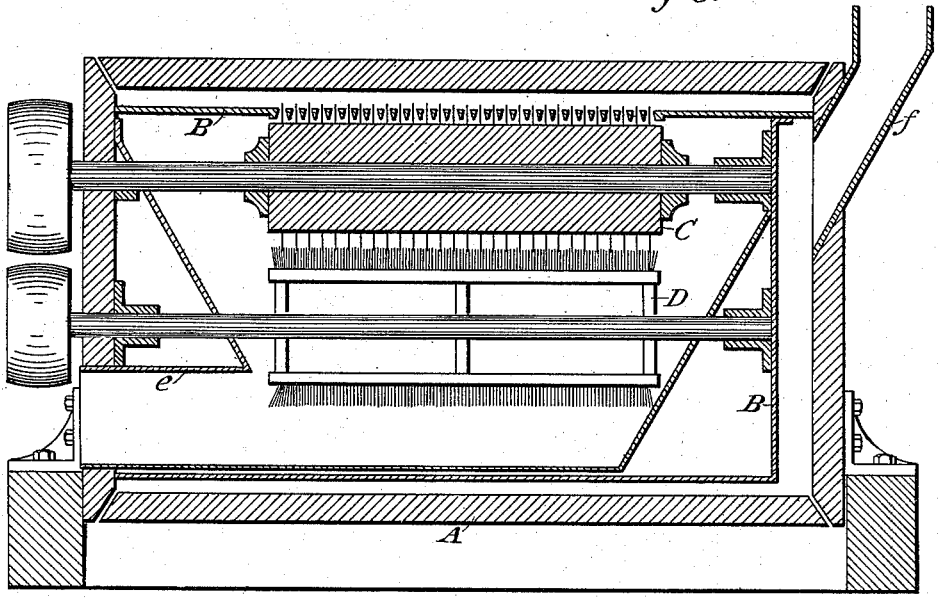
Witnesses
J. M. Stewart
F. A. Albright
Inventor
J. M. Pollard

UNITED STATES PATENT OFFICE.

JAMES M. POLLARD, OF WASHINGTON, DISTRICT OF COLUMBIA.

COTTON-SEED DELINTER.

SPECIFICATION forming part of Letters Patent No. 565,793, dated August 11, 1896.

Application filed January 9, 1896. Serial No. 574,849. (No model.)

*To all whom it may concern:*

Be it known that I, JAMES M. POLLARD, a citizen of the United States, residing at Washington, District of Columbia, have invented certain new and useful Improvements in Cotton-Seed Delinters; and I hereby declare the following to be a full, clear, and exact description of the same, reference being had to the accompanying drawings, in which—

Figure 1:
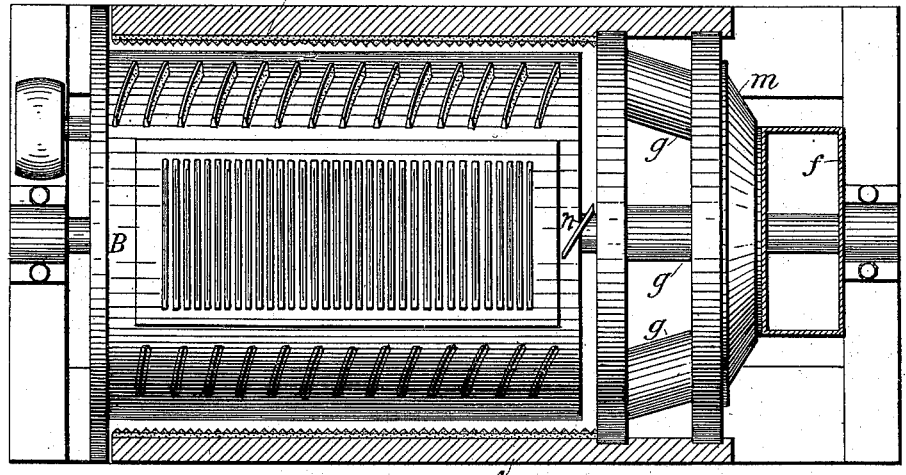
Figure 2:
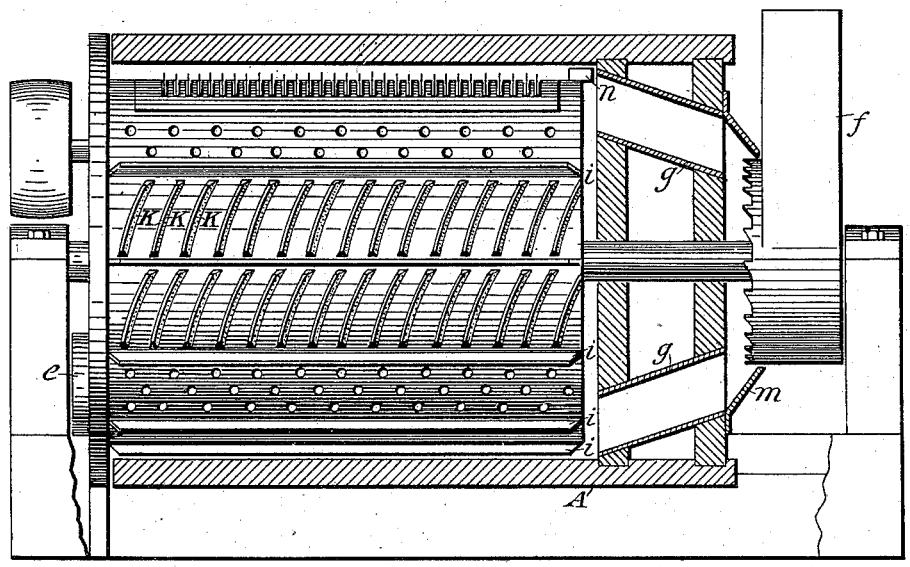
Figure 4:
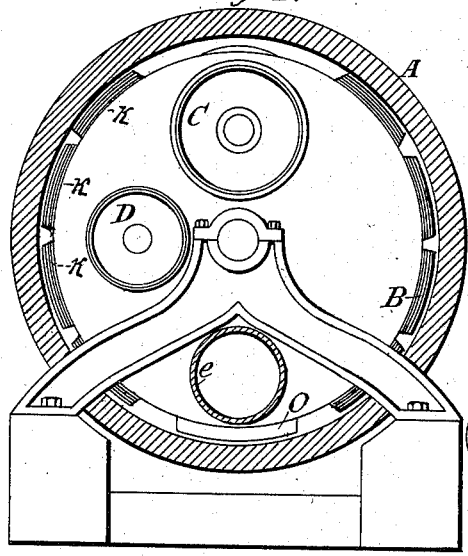
Figure 5:
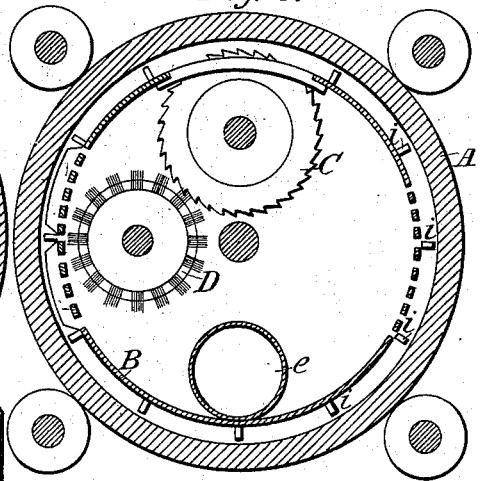
Figure 3:
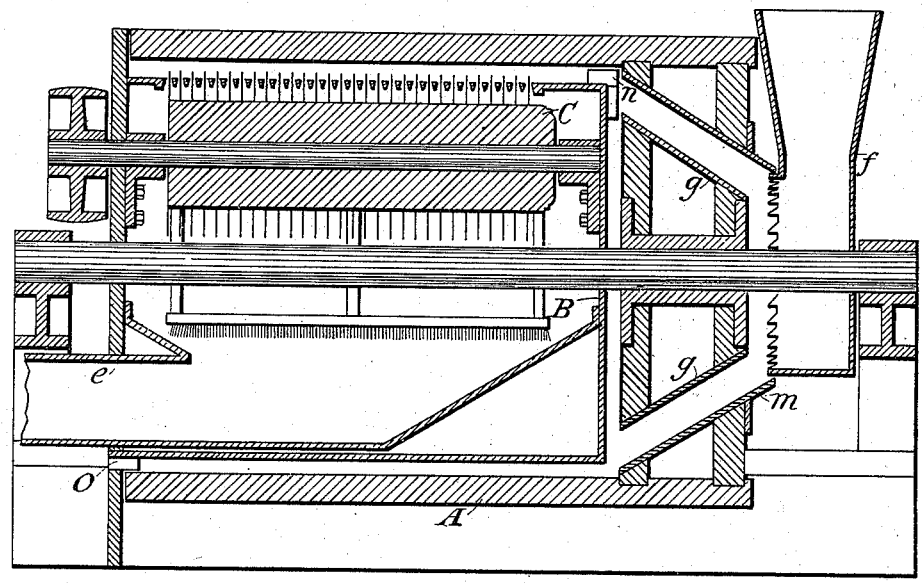

Figure 1 is a plan, the shell of the outer cylinder being in section, exposing the inner cylinder and the feed-tubes, the shaft and pulley of the saw-shaft being omitted. Fig. 2 is a vertical section of the outer cylinder through its long axis, with the inner cylinder in side elevation. Fig. 3 is a central longitudinal vertical section. Fig. 4 is a discharge end view, the outer cylinder being in transverse section, showing the frame, the discharge device, and the delinting guide-ribs with their grooves, as described. Fig. 5 is a transverse vertical section at any point near the discharge end of the machine shown in Figs. 1 and 2; Fig. 6, a like view of the modification shown in Fig. 9. Fig. 7 is a section, a plan, and edge view, respectively, of the delinting plate or lining of the outer cylinder. Fig. 8 is a side elevation, a plan, and an enlarged section of one of the delinting guide-ribs. Fig. 9 is a longitudinal vertical section of a modification shown in cross-section in Fig. 6.

Like reference-letters denote like parts throughout.

My invention relates to improvements in machines for delinting cotton-seed, and especially to that class of machines designed for completely divesting the seed of all fiber without breaking the hulls; and the objects of said invention are to remove the lint, dirt, and all impurities more completely and perfectly than has heretofore been accomplished, and to do this with more certainty as to results, and greater uniformity as to product, and a lessened expenditure of power.

In machines where the seed are passed into a narrow space between two oppositely-moving surfaces, or one surface in motion and another at rest, the seed tend to roll, after the manner of the ball-bearings of journals, and so to escape the frictional or rubbing action that is essential to removal of the lint, or else to collect in lumps, which then tend to roll or wedge between the surfaces and become crushed into a mingled mass of hulls, lint, and meats, which cannot be separated by any practical process and so prove a total loss. This is especially liable to happen at the point where the seed are raised against the action of gravity, as upon the ascending outer side of a horizontally-journaled cylinder. It is extremely difficult to keep the mass of seed in uniform movement even when aided by complex mechanism, and it is impossible to do so by frictional contact alone, as the seed tend to fly by centrifugal force away from the moving surface and then to find their way to the lowest portion of the inclosing case and accumulate there until the space is closely filled and strong frictional action ensues, this being followed by the wedging and crushing already described. There is also difficulty with those machines which operate by the use of some modification of the roll, after the fashion of cotton-gins, because the short staple of the lint does not lend itself to the formation of a coherent roll, and a mechanical roll around which the seed are distributed is therefore employed to retain the mass in requisite shape and to give it rotation. The roll must be inclosed in a tightly-fitting case to retain the circular form, and the operation is extremely wasteful of power and uncertain as to results. Attempts have been made to avoid the troublesome effects of gravity in these machines by a vertical arrangement of the cylinders; but in these the seed are found to pass through in inverse ratio to the speed, falling freely when the rotation is slow and slowly, if at all, when the rotation is rapid. The difficulty is only in part remedied by giving the cylinders a conical form or making them larger at the bottom, and is not overcome by a positive or forcing device of any kind, as the feed is in all cases most rapid with a slow motion and almost ceases to act with a high velocity, varying constantly with each change of speed, and this is true whether the inner or outer cylinder is made to revolve.

I have in great degree accomplished the results I have described as desirable, and have avoided most of the defects enumerated in the foregoing by means of the mechanism which, together with its operation, I will now describe.

The cylinder A is provided upon its inner surface with a delinting or abrading lining, which forms a practically true circle around the center of rotation, and this cylinder revolves around a fixed inner cylinder B, the surfaces of these cylinders being, say, three-fourths of an inch apart.

The seed are introduced into the outer cylinder by means of a gravity funnel or hopper $f$, which is provided with a horizontal extension or spout terminating next the rotating head of the cylinder and within an inclosing hood $m$, attached to and rotating therewith. The edges of this horizontal spout are serrated or toothed, so as to catch into and pull or tear in pieces any lumps or masses of seed that find their way into the hood, as the seed in passing out of the hopper into the hood assume the rotary motion of the cylinder and are at once caught and evenly distributed around the hood and across the feed-tubes by means of the teeth and stationary spout. They are next drawn into the cylinder through the inclined feed-tubes $g\ g\ g$, partially by the suction of an air-pump or exhaust-fan, of which more hereinafter, and partially by centrifugal action within the hood and feed-tubes. These tubes are inclined at or nearly at the angle of stability. That is to say, the angle at which undelinted cotton-seed would rest in the tube, but would slide out if the angle were increased. With any greater angle the centrifugal force constantly varies with changes of speed, and at high velocities becomes so excessive as to pack the seed tightly at the ends of the tubes and so cut off the air-current and stop the operation of the machine. With the tubes too nearly parallel to the axis of rotation the same force holds the seed too closely against the walls of the tube to permit them to yield to the air-current and here again varies with changes of speed. At the angle noted the seed require but a slight impulse to aid them down the incline upon which they are in effect exactly balanced, and changes of speed do not affect the feed in the slightest degree, that is, the effects of centrifugal action and gravity are exactly neutralized and the feed is effected by the indrawn air-current as perfectly as though the parts were at rest.

The inner cylinder does not revolve, and is provided at one or more points upon its surface with a plow-shaped projection $n$ to take under the seed as they cling by centrifugal force to the inner surface of the revolving cylinder and to project them forcibly into the annular space between the cylinders. They become evenly distributed upon the surface of the revolving cylinder, to which they closely adhere by centrifugal force.

A series of stops $i\ i$ are fixed upon the surface of the inner cylinder and extend from end to end thereof, their function being to intercept and detain the seed while the cylinder revolves, and so to remove the lint by the action of the abrading-surfaces. These stops are best made of pure rubber strips about one-fourth or three-eighths of an inch in thickness, and they extend so as to nearly touch the surface of the revolving cylinder. I employ as many of these stops as can well find space on the cylinder, as the efficiency of the machine depends largely upon their proper action. They must hold the seed for an instant only and then yield to release them, and this they do automatically, because as the seed that are held are joined by others they accumulate until the friction upon the mass overcomes the resistance of the stop and it yields, thus permitting the passage of a portion of the seed, and this process is repeated with each stop in succession.

The inner cylinder is perforated, Fig. 2, over quite a proportion of its surface with openings as large as can safely be made and not permit the passage of the cotton-seed, and it is also preferably, though not necessarily, provided with a series of linter or gin saws, which project between ribs in the usual manner and into the annular space between the cylinders. These saws run either with or against the moving column of seed and serve to withdraw the lint from this space as rapidly as it is detached from the seed and also to aid in detaching it. The lint is removed from the saw-teeth, as in a cotton-gin, by a revolving brush. The removal of the lint is also partially, and may on occasion be wholly, accomplished by a powerful air-current induced by an exhaust-fan (not shown in the drawings) but acting through the duct $e$ and interior of the inner cylinder. This air-current enters the machine through the feed inlets or tubes, and may in so doing be made to wholly supply the machine with seed, and it also enters at the discharge-opening for the seed and intercepts at this point and returns to the machine all lint, dust, and other light trash and also all undelinted seed that may have escaped the proper action of the machine, carrying all these before it to the delinting-surfaces for further action. The lint and dust are sucked into the inner cylinder through the perforations and also through the spaces between the saws and ribs, and the machine works very advantageously in this respect, because as the lint is detached it is at once removed from the abrading-surface by the heavier seed which are pressed by centrifugal force against the surface of the revolving cylinder, forcing the lint and lighter substances away and within into immediate contact with the inner cylinder and its saws and perforations, into which the air-current is being drawn, so that it cannot escape the action of these devices. Another important function is subserved by this air-current in drawing the seed together from each end of the cylinders and crowding them together over the central portions, because the machine acts to best advantage when well filled with seed, and still another desirable end is attained by this free circulation of air over the entire working surface in keeping it cooled to a safe temperature and removing the heat caused by the great amount of friction employed to delint the seed. A series of guide-ribs $k\ k\ k$, attached to the surface of the inner cylinder, insures positive and uniform translation of the seed from the feed to the discharge end of the machine. In other words, the seed introduced into the machine pass through it with a definite number of revolutions of the cylinder. These ribs are preferably formed of emery, and the sides exposed to the impact of the seed are grooved with shallow depressions 2, which may be of U or obtuse-angled V form, and such as to closely fit a portion of a cotton-seed. These ribs may be used in greater or less numbers, but I design employing them to as far as possible dispense with the stops, and to this end will employ ribs thinner in cross-section than those illustrated in Fig. 7, and of such height as to nearly touch the surface of the revolving cylinder.

The emery-plates lining the outer cylinder are preferably segmental in form, fitting closely and accurately together to form a true circle, and these plates are grooved in the same manner as the ribs, the grooves being designed to closely fit the seed, and they are so arranged on the plates that when these are joined together upon any of their sides the grooves of one plate will coincide with and form continuations of the grooves of any other, that is to say, the grooves are continuous when the plates are joined in any direction. These grooves are shown in Fig. 7 at an angle of forty-five degrees, but in practice are not more than seven to ten degrees inclination from the plane of rotation, and the inclination is such that when the seed are pressed into these grooves and held by the stops against rotating with the cylinder they follow the inclination or direction of the groove and are thereby carried toward the discharge end of the machine.

I have shown a cylinder D, carrying brushes for clearing the saws of lint.

I have not shown fully or described the details of the framing or manner of journaling the cylinders. I have practically used the methods shown in the drawings and find no trouble in securing absolute steadiness of rotation, even when, as in Fig. 9, both heads are stationary and the shell only of the cylinder revolves upon the rollers placed equidistant from each other near each end, and preferably four or more in number, as shown in Figs. 5 and 6.

The principal advantages gained by my invention are such as follow the certainty of movement secured by the rotation of the outer cylinder. The seed cling closely to its inner surface and the action is as positive and certain upon the ascending side as upon the opposite side or top or bottom of the cylinders. With a similar arrangement of cylinders but with a rotating interior and stationary outer cylinder much trouble is experienced, as I have already shown.

It is obvious that various changes might be made in the arrangement of parts without departing from the spirit and intent of my invention, especially as to the arrangement of parts required to utilize the air-current for the purposes described, but these would fall well within the limits of my invention, and are covered by my claims.

Having now described my invention, I claim—

1. In a cotton-seed delinter the horizontally-journaled revolving outer cylinder, provided with the abrading-lining, in combination with a fixed interior cylinder.

2. In a cotton-seed delinter the horizontally-journaled revolving outer cylinder provided with the abrading-lining, in combination with a fixed interior cylinder having the stops.

3. In a cotton-seed delinter the horizontally-journaled revolving outer cylinder with its abrading-lining, the fixed interior cylinder having the stops and also provided with a series of guide-ribs for moving the seed toward the discharge-opening as described.

4. In a cotton-seed delinter the horizontally-journaled outer revolving cylinder and fixed interior cylinder in combination with the guide-ribs formed of delinting or abrading material.

5. In a cotton-seed delinter the horizontally-journaled revolving outer cylinder with its abrading-lining, the fixed interior cylinder having the stops and provided with a series of perforations.

6. In a cotton-seed delinter the horizontally-journaled revolving outer cylinder with its abrading-lining and a fixed interior cylinder provided with a series of saws projecting into the space between the cylinders.

7. In a cotton-seed delinter the horizontally-journaled revolving outer cylinder with its abrading-lining, the fixed interior cylinder having the stops and perforations, and means for exhausting the air from said interior cylinder for the purpose of removing the lint.

8. In a cotton-seed delinter the horizontally-journaled outer revolving cylinder with its abrading-lining, the fixed interior cylinder having the stops, the perforations, and the saws, and means for exhausting the air from the interior.

9. In a cotton-seed delinter the horizontally-journaled revolving outer cylinder in combination with a fixed interior cylinder, a tube or tubes for introducing the seed, and means for inducing a current of air through said tube or tubes.

10. In a cotton-seed delinter a horizontally-journaled revolving outer cylinder, a fixed interior cylinder, a tube or tubes for the introduction of seed, an opening for the discharge of seed and means for inducing a current of air through these openings.

11. In a cotton-seed delinter a horizontally-journaled outer revolving cylinder and fixed interior cylinder provided with a series of saws, inlet and discharge openings for the seed and means for inducing a current of air inwardly through these openings and around and between the same.

12. In a cotton-seed delinter the horizontally-journaled revolving outer cylinder and fixed interior cylinder, frictional abrading-surfaces and devices arranged between the cylinders and means for inducing and maintaining a current of air over the entire frictional surfaces to reduce the temperature.

13. In a cotton-seed delinter the horizontally-journaled outer revolving cylinder and fixed interior cylinder, an inlet for the seed at one end of these cylinders, and a discharge for the seed at the other end, and means for exhausting the air midway of these openings, whereby the working spaces are kept properly filled with seed.

14. In a cotton-seed delinter the horizontally-journaled outer revolving cylinder having the inclined feed-tubes.

15. In a cotton-seed delinter the horizontally-journaled outer revolving cylinder having the inclined feed-tubes and the inclosing hood.

16. In a cotton-seed delinter the horizontally-journaled outer revolving cylinder having the inclined feed-tubes, the inclosing hood, and a funnel or hopper provided with a spout which terminates within the hood.

17. In a cotton-seed delinter the horizontally-journaled outer revolving cylinder having the inclined feed-tubes, the hood—the hopper and spout extending into the hood, and provided with the serrated or toothed edges.

18. In a cotton-seed delinter the horizontally-journaled revolving outer cylinder having the inclined feed-tubes set at about or approximately at the angle of stability and means for inducing a current of air through the tubes.

In testimony that I claim the foregoing I hereunto subscribe my name.

JAMES M. POLLARD.

Witnesses:
WM. F. BROWN,
D. P. COWL.